Figure 1:
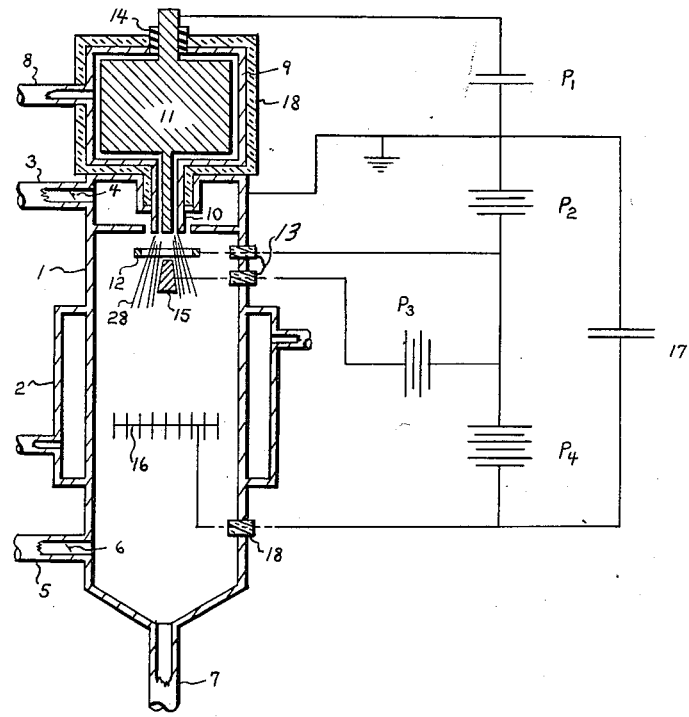

Jan. 29, 1952  L. H. SMITH  2,583,898
VAPOR PHASE ELECTROCHEMICAL PROCESS
Filed June 21, 1948  2 SHEETS—SHEET 1

INVENTOR.
Lester H. Smith

Jan. 29, 1952      L. H. SMITH      2,583,898
VAPOR PHASE ELECTROCHEMICAL PROCESS

Filed June 21, 1948      2 SHEETS—SHEET 2

INVENTOR.
Lester H. Smith

Patented Jan. 29, 1952

2,583,898

UNITED STATES PATENT OFFICE 2,583,898

VAPOR PHASE ELECTROCHEMICAL PROCESS

Lester H. Smith, Maplewood, N. J.

Application June 21, 1948, Serial No. 34,300

23 Claims. (Cl. 204—164)

This invention is concerned with an improved method of producing chemical reactions in which an ionized gas is one of the reactants or is an activating agent for the reaction. Other reactants involved may be in the form of gases or suspensions of liquid or solid particles in gases.

This process application is a continuation-in-part of my copending applications Serial Numbers 504,531, Patent No. 2,454,757 issued November 23, 1948 relating to apparatus for electric space charge devices and 613,174, now abandoned, relating to processes involving electric space charges combined with high frequency fields.

Considerable experimental work has been done in the field of electro-chemistry of gaseous systems. For the most part, this work has been concerned with high voltage discharges at low gas pressures such as glow discharges or silent discharges, and to some extent with arc discharges. Both direct currents and high frequency currents have been used. A wide variety of chemical changes have been accomplished on an experimental scale with low gas pressure electrical discharges ranging from various syntheses reactions, polymerization of certain gases, particularly hydrocarbons, and decomposition and recombination of gas reactants.

A large amount of data has been obtained with the mass spectrograph identifying the various gas ions produced in electric discharges. Various positive and negative ions of the pure gases, dissociation products of complex molecules and ions of increased molecular weights compared to the discharged gas are well known. These experimental observations of gas ions are generally in accordance with the theory of valences and radicals.

The major portion of the experimental work on chemical syntheses in electrical discharges has involved activation of mixtures of two or more gas reactants; in other words, presumably both reactants were un-ionized. However, since similarly charged ions repel each other, it is to be expected that the ions of each reactant gas react with surrounding un-ionized gas molecules. Experimental results support this theory and it is generally accepted.

Ionized gas molecules or atoms may also serve as catalytic agents due to the attraction which they exert on other gas molecules, resulting in a clustering or adsorption of gas molecules around each ion which it is well known is characteristic of catalytic agents.

The object of this invention is to provide a method for introducing the necessary activation or catalytic energy in electrical form into reactant gases on a commercial scale which is competitive with other processes involving higher temperatures, high gas pressures and material catalytic agents.

In order to bring about large scale gas ionization in a reaction vessel at reasonable operating temperatures and pressures, this invention makes use of electric space charge devices for projecting electrcally charged physical particles of one reactant from an emitting electrode or commbination of electrodes into a reaction space where a suitable potential gradient is maintained which promotes a drift of electrically charged particles or gas ions toward a collecting electrode. At a point of travel of the charged physical particles, these particles are caused to evaporate or be consumed in a chemical reaction, thereby dispersing the electric charges on the particles throughout the vapor or gaseous reaction products. In this manner ionized or activated gas is produced which is available for further chemical reaction with itself or with other gases or suspended material in gases which may also be introduced into the reaction space.

Either positively or negatively charged physical particles can be projected into a reaction space and gasified to produce positively or negatively charged gas ions. I prefer to use electrode potentials of proper polarities to produce gas ions which are to be expected from general valence considerations.

This invention should not be confused with other processes involving the projection of electrically charged physical particles in gases using two electrodes only, and in which gasification of any suspended particles present is incidental and is not controlled so as to take place while particular particles are electrically charged.

This invention should also not be confused with gas ionization processes involving impact ionization by electric charges obtained by high voltage surface emission or from hot cathodes in reaction vessels. Such processes are limited to low gas pressures and for gas phase chemical reaction purposes are not commercially practicable.

One object of the present invention is to provide an electrical method for bringing about gas phase chemical reactions involving the decomposition and recombination of only one reactant, such as polymerization reactions.

A further object of this invention is to provide a method for gasifying and ionizing one reactant which may be introduced into a reaction vessel in liquid form and to bring about a gas phase reaction with other reactants present which may be in the form of gases or suspensions in gases.

Another object of this invention is to provide a method for passing ionized gas as one reactant or agent through a reaction chamber countercurrent to the passage of another reactant in the form of a gas or suspension in a gas in order to control a gas phase reaction by regulating the length of time for gas ions to traverse the reaction space between electrodes.

A further object of this invention is to provide a method for mixing of a heated gas reactant with electrically charged liquid particles of another reactant to bring about gasification of these particles and to supply the heat requirements of any dissociation of gas molecules which may take place.

Another object of this invention is to provide a method for electrically charging liquid sprays of reactant materials of high dielectric strength and gasifying and ionizing said reactant materials.

A still further object of this invention is to provide a method for electrically charging liquid sprays of reactant materials with electrical conductivities comparable to pure water and for gasifying and ionizing said reactant materials.

Another object of this invention is to provide a method for reacting one or more gaseous substances by means of recirculating, gasifying and ionizing another liquid substance which may be a liquid product of the gas phase reaction in question.

Other objects of this invention will be apparent from the drawings and the following description of the features of the invention and in the provision of apparatus and methods of operation for accomplishing the foregoing objects.

In order to project electrically charged liquid spray particles of various reactants in an electric space charge device, this invention preferably makes use of spray nozzles and spray tubes which will be described in detail in connection with the drawings. A gas blast may be used in conjunction with the nozzle or tube to promote atomization of the liquid and to control the direction of the spray relative to various electrodes.

Electrically charged liquid sprays utilizing water as the sprayed liquid have been utilized for electrical precipitation purposes. In order to project electrically charged liquid particles of hydrocarbons or liquified gases which have relatively high dielectric strengths, it is preferable to spread such liquid materials in a thin film between electrodes with a fairly close spacing. This thin film of electrically charged liquid is projected in the form of spray particles which are subsequently gasified. Means has also been provided for agitating this thin liquid film between electrodes when desired. This will be made clear in the description of the apparatus.

The continuous withdrawal of an electrically charged thin film of liquid from between two electrodes is equivalent to withdrawing the dielectric from between two condenser plates. It is well known that when this is done, the opposite surfaces of the dielectric layer are electrically charged with opposite polarity. A method is also described for charging the liquid film and spray to one polarity.

Referring to the drawings:

Fig. 1 illustrates a preferred type of apparatus which may be used for gas phase reactions in which one reactant or agent is introduced as an electrically charged liquid spray which is gasified and ionized and a second reactant which is a gas or gas mixture is introduced around the periphery of the spray nozzle or tube. An electrode arrangement is provided for neutralizing part of the spray particles of a two polarity electrically charged spray.

Figure 2:
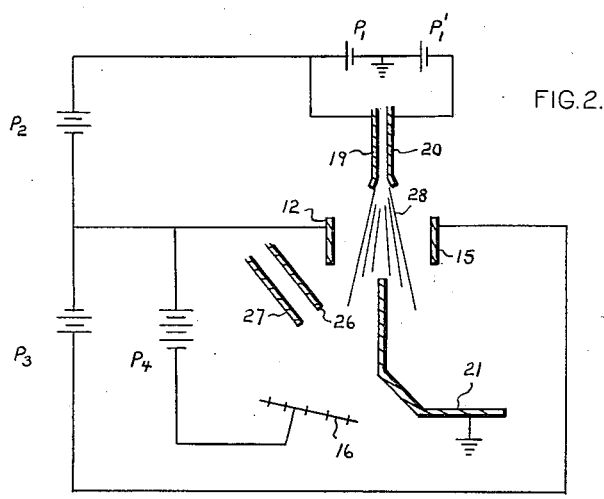

Fig. 2 shows schematically an arrangement which might be employed for dividing a two polarity electrically charged spray by means of a baffle. In this case a liquid spray from a narrow slot is shown, the opposite walls of the slot being charged to opposite polarity and producing charged spray particles of both positive and negative polarities.

Figure 3:
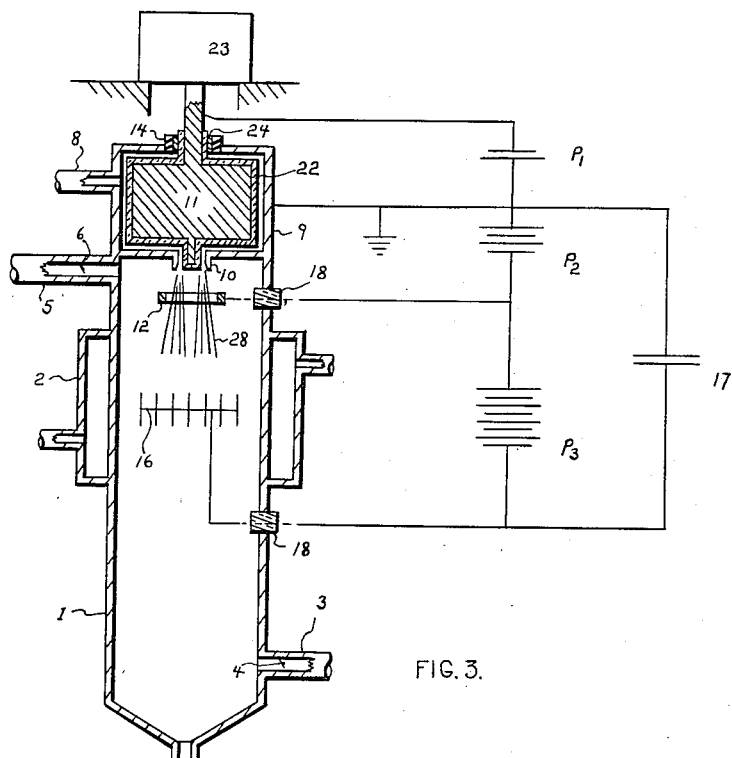

Fig. 3 illustrates a preferred type of apparatus which may be used for gas phase reactions in which an ionized gas reactant produced by means of a gasified electrically charged liquid spray is mixed with a second gas reactant which may flow through the reaction space countercurrent to the liquid spray. A modified arrangement of liquid film charging electrodes and spray tube is shown in which the inner electrode is coated with an insulating film such as glass or ceramic material for the purpose of obtaining electrical charges in the liquid film which are predominantly one polarity.

Figure 4:
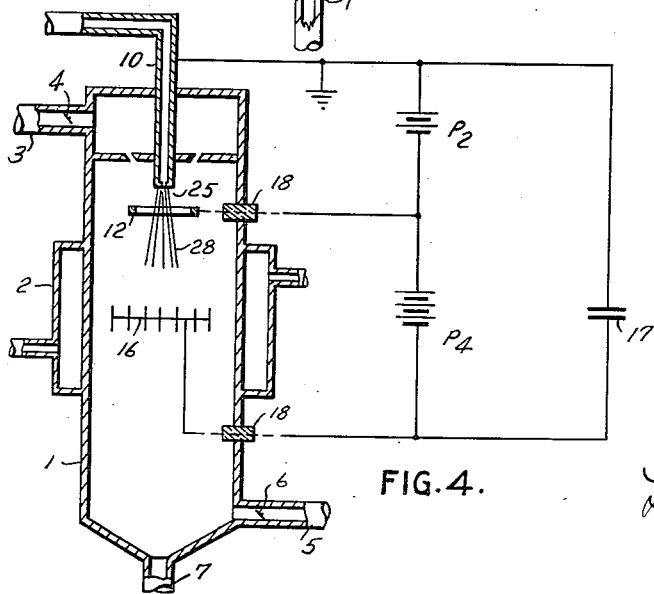

Fig. 4 illustrates a form of apparatus in which an electrically charged liquid spray of conductivity comparable to water is gasified to produce ionized gas which is reacted with a second gaseous reactant which is introduced through a gas passage around the liquid spray tube.

The experimental scale apparatus shown in Fig. 1 may be employed for the synthesis of ammonia from nitrogen and hydrogen, using liquid nitrogen as the reactant to be sprayed, gasified and ionized. The other reactant, hydrogen gas, may be introduced around the periphery of the liquid nitrogen spray tube. The vessel 1 in Fig. 1 is of metal construction suitable for low temperatures and is provided with a cooling jacket 2, a gas inlet 3 with inlet valve 4, a gas outlet 5 with outlet valve 6 and a liquid outlet 7. The liquid nitrogen inlet 8 is connected through cylindrical housing 9 to the liquid spray tube 10. Housing 9 is provided with a layer of cold insulation 13. The liquid film charging electrodes consist of the liquid spray tube 10 and the internal electrode 11. These film charging electrodes together with intermediate electrode ring 12 are used for producing an electrically charged spray of liquid nitrogen.

The cylindrical housing 9 and spray tube 10 are of conducting material and with the internal electrode 11 which is cylindrical and is supported by the insulating sleeve 14, constitute the plates of an electrical condenser of which the liquid nitrogen film passing between them is the dielectric. It is well known that the surfaces of a dielectric film in a condenser can hold a residual electric charge with the plate conducting surfaces removed. This is essentially what happens when the liquid nitrogen film passes out of the tube 10 and forms a jet spray. Electrically charged particles of both positive and negative polarities are produced. Dispersion of the outer fringe of positively charged particles, which in this case are the ones used, is promoted by gasification of the particles and the potential gradient between electrodes 12 and 15. Electrode 15 in the form of a conical frustrum, functions as a collecting electrode for unwanted negatively charged particles and gas.

The collecting electrode 16, consisting of parallel grid plates, is used to promote a drift of positively charged liquid particles and positive gas ions in a downward direction. At the same time hydrogen gas enters around the periphery of spray tube 10 and mixes with the ionized nitrogen gas.

In an experimental scale apparatus as shown in Fig. 1, I prefer a reaction vessel 1 about 6 inches in diameter with a spacing of 1 inch between the end of spray tube 10 and intermediate electrode 12, and a spacing of 5 inches between electrodes 15 and 16. It is preferable to have these spacings adjustable to obtain optimum operating conditions. Ring electrode 12 may be 2 inches inside diameter and electrode 15 may be ¼ inch in diameter at the small end and ½ inch in diameter at the large end and about ¾ inch long. Cylindrical housing 9 is of convenient size to give approximately 50 square inches of surface in contact with the liquid nitrogen film. Tube 10 may be 0.250 inch inside diameter and internal electrode 11 may be 0.236 inch in diameter at the point where the liquid jet is formed. At other points, as close a clearance as is practicable is desirable between electrode 11 and housing 9. Potential sources shown may have the following values: $P_1$—500 volts, $P_2$—2000 volts, $P_3$—2000 volts, $P_4$—4000 volts. All potentials are direct current. Electric condenser 17 of about 1 mfd. promotes the flow of current from the emitting electrode or tube 10.

The lead wires to electrodes 12, 15 and 16 are provided with suitable insulating bushings 18 of ceramic material where they pass through the wall of vessel 1. These insulating bushings may be heated by internal heating elements, for example, in order to prevent condensation on the surfaces thereof.

The function of the charging electrodes 10 and 11 in conjunction with intermediate electrodes 12 and 15 is to project electrically charged liquid particles which are in such a state that they may be gasified after leaving the surface of electrodes 10 and 11. In order to accomplish this, the temperature and pressure of the liquid particles projected from emitting electrodes 10 and 11 may be such that flash vaporization of the spray particles takes place. Additional heat for gasification of the spray particles may be derived from the gas entering around the periphery of spray tube 10 and from reactions which are exothermic.

Referring again to the apparatus shown in Fig. 1 as used for ammonia synthesis, the operation of this process would be as follows: Liquid nitrogen at approximately minus 195° C. and 400 lbs. p. s. i. g. is introduced at a controlled rate through spray tube 10 forming a pattern of spray particles 28. Spray particles of two polarities are produced in the spray pattern 28. Positively charged spray particles form an outer hollow cone pattern around an inner hollow cone pattern of negatively charged spray particles. The positively charged spray particles are attracted toward ring electrode 12 due to the potential gradient between spray tube 10 at ground potential and electrode 12 which is 2000 volts negative potential relative to ground. Positively charged spray particles do not impinge on electrode 12 but pass through it toward collecting electrode 16. Negatively charged spray particles are attracted to electrode 15. Electrode 15 is 500 volts positive potential relative to electrode 11 and 2000 volts positive relative to electrode 12. The potential gradient between electrodes 12 and 15 is necessary to overcome the attraction between oppositely charged liquid nitrogen spray particles so that these particles do not meet and electrically neutralize each other. The net result is a pattern of liquid nitrogen spray particles positively charged which comes under the influence of the potential gradient between collecting electrode 16 and electrodes 12 and 15. Evaporation of these liquid nitrogen spray particles, positively charged, is completed by the time that these particles are under the influence of the potential gradient between electrode 16 and electrodes 12 and 15. Ionized nitrogen gas produced by the evaporation of these charged spray particles is available to react with hydrogen gas present in the space between electrodes 12 and 15 and electrode 16. The hydrogen gas at 195 lbs. p. s. i. g. and approximately atmospheric temperature is introduced into the reaction zone through inlet 3 and the slot around the periphery of spray tube 10. Temperature control in the reaction zone may be accomplished in several ways. In addition to the heat of vaporization of the nitrogen which must be supplied, the vessel 1 may be jacketed as shown and a refrigerant circulated through the jacket 2. Balanced against the heat removed is the heat of the reaction plus the heat content of the hydrogen gas. I prefer a temperature of 35° C. and pressure of approximately 195 lbs. p. s. i. g. in the reaction space which is favorable for ammonia formation. Control of the temperature and pressure changes the conversion efficiency and the heat liberated. The blast of cold nitrogen gas, ionized to a certain extent is depended upon to maintain the low temperature of the liquid nitrogen spray as it issues from tube 10, in spite of the heat radiated from the reaction zone.

Ammonia is separated from the unreacted gas and ammonia mixture released through outlet 5 by condensing means which do not form a part of this invention. Flow rates may be approximately 14 pounds per hour of liquid nitrogen to 600 std. cu. ft. per hour of hydrgen gas. In a full scale application of this process it should be economical to recirculate unreacted gases to the reaction zone including a hydrogen make-up.

The process which has been described in connection with Fig. 1 will suggest many similar applications to reactions involving ionized nitrogen in gaseous form. For example, the apparatus of Fig. 1 could readily be used for reactions between ionized nitrogen and various hydrocarbons such as carbon monoxide or ethylene to produce cyanogen and hydrogen cyanide. The process may also be used for the oxidation of nitrogen, using pure oxygen gas reacting with the ionized gaseous nitrogen. In each case the temperature and pressure in the reaction space should be that most favorable for a high concentration of product in equilibrium with the reactants, and may be favorable for product condensation. Such equilibrium and condensation data is the same as is in common use in connection with these processes as carried out with material catalytic agents.

Fig. 2 shows an alternate arrangement which is applicable to the apparatus of Fig. 1 for separating negatively and positively charged spray particles and ionized gas by means of a baffle or partition which divides the liquid spray and the ionized gas. In this case the close clearance liquid passage is a slot having opposite conducting walls 19 and 20 across which is impressed potentials $P_1$ and $P_{1'}$ of 250 volts each. Intermediate plate electrodes 12 and 15 deflect charged spray particles 28 toward them so that the spray impinging on baffle 21 is essentially uncharged. Baffle 21 is at ground potential. In this example, the positively charged spray particles deflected toward electrode 12 are gasified to produce positively ionized gas which is mixed and reacted with a second gas reactant introduced through a slot having opposite walls 26 and 27. Collecting electrode 16 maintains the drift of ionized reactant gas and reaction products through the reaction space. Potenials $P_2$, $P_3$ and $P_4$ may be the same values as in Fig. 1. As a result, electrode 12 is 2000 volts negative potentian relative to electrode 19; electrode 16 is 4000 volts negative relative to electrode 12; and electrode 15 is 2000 volts positive relative to electrode 12 and 500 volts positive relative to electrode 20.

It is obvious that the electrical synthesis process which has been described in connection with Fig. 1 offers many advantages over processes using material catalytic agents. Operating temperatures and pressures are lower than most catalytic synthesis processes. There is no catalyst contamination problem. There are a number of elements which may be used to control the product such as the temperature and pressure, the electrode spacing and voltages and the relative feed rates of the reactants and the resultant gas velocities in the reaction space.

In Fig. 3 the vessel 1 is of metal construction and includes a cooling jacket 2. Tubular connections 3 and 5 may be used interchangeably for gas reactant inlet and gas outlet, depending upon whether the flow of the gas reactant is with the liquid spray or countercurrent to it. A cylindrical metal housing 9 is connected to the liquid spray tube 10 and is provided with an internal electrode 11 which includes a 0.010 inch thick ceramic insulating coating 22. The internal electrode 11 is arranged so as to be rotated at about 200 R. P. M. by motor 23 by means of an extension of this electrode through a combination insulating bushing 14 and bearing 24. Liquid reactant enters through liquid inlet 8 and passes through the close clearance passage between housing 9 and internal electrode 11 and is projected as a liquid spray 28 from tube 10. As previously described in connection with Fig. 1 a removable dielectric film in an electric condenser holds residual electric charges on opposite surfaces of the dielectric film when, in effect, the condenser plates are removed. These charges on opposite surfaces of the dielectric film are normally of opposite polarity. In this instance two dielectric films are in contact and one is immovable. Furthermore, the liquid film is agitated by the rotary action of the internal electrode ceramic coated surface. The result is that the liquid dielectric film becomes charged to the same polarity as the cylindrical housing 9 and spray tube 10 and produces a liquid spray which is predominantly one polarity.

The intermediate electrode ring 12 and collecting electrode 16 of Fig. 3 are the same in principle as in Fig. 1 and Fig. 2. The equivalent of electrode 15 in Figures 1 and 2 is not required in Fig. 3 since no deflecting or segregating of spray particles of different polarities is necessary. In Figures 1 and 2 electrode 12 acts in conjunction with electrode 15 to deflect charged spray particles but the primary purpose of electrode 12 in each case is to function as an intermediate electrode between the emitting electrode arrangement or liquid film charging electrodes and the collecting electrode. Electrode 12 in Fig. 3 provides the necessary potential gradient where the liquid jet issues from the emitting electrode arrangement to promote a flow of electric current or charge in the jet. Electrode 12 is not in the path of the jet and is sufficiently close to the emitting electrode arrangement or jet source so that ionized gas produced as a result of gasifying electrically charged particles drifts towards collecting electrode 16. For use on an experimental scale, vessel 1 would preferably be 6 inches in diameter with a spacing of 1 inch between spray tube 10 and intermediate electrode 12, and a spacing of 5 inches between electrodes 12 and 16. Spray tube 10 and internal electrode 11 including ceramic coating 22 may be the same dimensions as in Fig. 1 except for the extension of electrode 11 which connects to motor 23. Potential sources are $P_1$—1000 volts, $P_2$—2000 volts and $P_3$—4000 volts direct current. Electric condenser 17 is the same as in Fig. 1, as are the arrangements for insulating lead wires through bushings 18 in the wall of vessel 1.

The apparatus of Fig. 3 may be used for the polymerization of n butane, in which case I prefer an operating pressure of 30 lbs. p. s. i. g. at 50° C. in the reaction space. N butane in liquid form at 150 lbs. p. s. i. g. pressure would be introduced through the annular space between electrode 11 and the inner wall of housing 9.

The open end of liquid spray tube 10 may be flared out to advantage in some cases. Since the fluid velocity is high, the liquid jet which may form separate filaments at this point loses contact with the surface of tube 10 and also electrode 11 while still in the throat of the annular space. In this manner advantage is taken of the electrostatic field between tube 10 and electrode 11 and the narrow spacing between them at the moment that the liquid separates from these surfaces. The electric charges which are trapped in the jet are retained in the liquid filaments and on the spray particles formed due to the potential gradient between electrode 12 and electrodes 10 and 11.

At the same time that the electrically charged liquid spray particles of n butane are projected from the spray tube 10, n butane and lighter components in vapor form at 70 lbs. p. s. i. g. and 70° C. are introduced through tube 3 and mix with the liquid spray. This vapor promotes evaporation of the charged liquid spray particles and is a source of material for the polymerization reaction. If a hydrocarbon liquid, for example, of a certain boiling range is introduced as a charged spray, the ionized gas resulting will probably be of the higher boiling components since this material is the last evaporated. If lower boiling components are to be made available for the reaction, obviously it is more efficient to introduce them as a gas to be mixed with a charged spray having a high percentage of one component.

In the reaction space between spray tube 10 and collecting electrode 16 *n* butane polymerization products are formed due to the chemical activity and theoretical clustering influence of the ionized gas molecules. Residual electric charges in the gaseous or condensed products are attracted to collecting electrode 16 or to the walls of vessel 1. Some liquid product may be withdrawn at outlet 7 and the remainder is condensed from the exit gas stream leaving the vessel at 5. Unreacted gas may be recycled in either the liquid or vapor feed streams. Control of the product is obtained by varying the compositions and the temperatures of the gas and liquid feed streams and the temperature and pressure of the reaction space. The electrode spacings and voltages can also be varied. Flow rates may be 8 pounds per hour of liquid n butane to about 500 std. cu. ft. per hour of n butane and lighter vapor.

The apparatus of Fig. 3 may also be utilized for syntheses reactions in which a gasified liquid spray which produces ionized gas may be utilized. For example, a light hydrocarbon liquid which would be sprayed from spray tube 10 and gasified and ionized could be reacted with carbon monoxide gas to produce heavier hydrocarbons plus oxygenated hydrocarbons. If n butane were used, the physical dimensions of the apparatus as well as the inter-electrode voltages and the temperature and pressure of the liquid butane before spraying may be the same as previously described for Fig. 3. The operating pressure in the reaction space may be 70 lbs. p. s. i. g. Carbon monoxide gas would be introduced through gas inlet 3 at a temperature of about 40° C. Since the reaction is exothermic, it is desirable to circulate cooling water through jacket 2 so that a temperature of about 120° C. is maintained in the reaction space. Hydrocarbon and oxygenated hydrocarbon products resulting from the reaction between the carbon monoxide and the ionized n butane gas are recovered from the exit gas which is discharged from outlet 5. A mixture of products will be obtained similar to the products which are obtained from high temperature and pressure synthesis of the same reactants with material catalytic agents. A representative liquid product of the above described conditions using n butane and carbon monoxide reactants should consist of aliphatic hydrocarbons, both saturated and unsaturated, and oxygenated hydrocarbons. Hydrocarbons present would include octane, nonane, isononane and heavier. Oxygenated hydrocarbons would include alcohols, pentanol and higher, aldehydes, ketones and organic acids such as propionic and butyric. Flow rates may be 8 pounds per hour of liquid butane to about 600 std. cu. ft. per hour of carbon monoxide gas.

The apparatus shown in Fig. 4 may be used for producing reactions between gases and liquid substances of relatively high electrical conductivity which are sprayed and gasified and ionized. Such a liquid substance must be one which leaves no residue when it is gasified. For illustration purposes, I shall use a reaction involving pure water as the reactant or activating agent which is introduced as an electrically charged spray and is gasified to produce ionized vapor which is contacted with a mixture of carbon monoxide and hydrogen gas to produce oxygenated hydrocarbons.

In Fig. 4 the vessel 1 is of metal construction and includes a cooling jacket 2, a gas inlet 3 with inlet valve 4 and a gas outlet 5 with outlet valve 6 and a liquid outlet 7. A liquid spray tube 10 with an orifice 25, also of metal is connected to an external source of water at suitable temperature and pressure. The water spray from tube 10 is directed so as to pass through the intermediate ring electrode 12 toward the collecting electrode 16. The vessel 1 and spray tube 10 are grounded. Direct current potential sources shown may have the following values: $P_2$—2000 volts, $P_4$—4000 volts. Electric condenser 17 of about 1 mfd. promotes the flow of current on the spray particles. When conducting fluids are sprayed and are electrically charged, the filaments of liquid in the jet, until they are broken by surface tension, are essentially a part of the spray tube which may be considered one plate of an electrical condenser with the intermediate and collecting electrodes the other plate.

In Fig. 4 I prefer a reaction vessel about 6 inches in diameter with a spacing of 1 inch between the end of spray tube 10 and intermediate electrode 12 and a spacing of 5 inches between electrodes 12 and 16. The orifice in tube 10 is about 0.008 inch in diameter. The lead wires in Fig. 4 are provided with insulating bushings 18 as in Fig. 1.

Referring again to the apparatus shown in Fig. 4 as used for a gas phase reaction of carbon monoxide, hydrogen and ionized water vapor, the operation of this process would be as follows: Water in liquid form at a pressure of 200 lbs. p. s. i. g. and 210° C. is introduced as an electrically charged spray 28 through the spray tube 10. At the same time a carbon monoxide and hydrogen and recycle gas mixture which is about two parts of carbon monoxide to one part of hydrogen by volume is introduced through inlet 3 into the reaction space at about 50 lbs. p. s. i. g. pressure and 260° C. Vaporization of the electrically charged water spray absorbs heat and the heat of the reaction is exothermic. The temperature in the reaction space may be maintained about 260° C. Flow rates may be about 500 std. cu. ft. per hour of carbon monoxide and hydrogen gas mixture to 8 pounds per hour of liquid water. Oxygenated hydrocarbon products such as formaldehyde and formic acid are recovered from the exit gas leaving the vessel through outlet 5.

All of the chemical processes which have been described thus far have involved one gaseous reactant and one reactant which can be readily liquified. With polymerization reactions one liquified reactant only may be involved. It is also possible to bring about reactions involving multiple gas reactants and one or more liquid reactants. An example of this type of process was given, namely a synthesis reaction between carbon monoxide gas and hydrogen gas and ionized water vapor to produce oxygenated hydrocarbons, water and carbon dioxide. As previously described, the ionized water vapor would be produced by means of an electrically charged water spray which is gasified in space.

The nozzle arrangement shown in Fig. 4 may be employed for projecting electrically charged particles of a liquid with a relatively low resistivity, such as pure water. For liquids of high dielectric strength, I prefer the constructions of Figures 1, 2 and 3. In the claims which follow, I have used the expression "emitting electrode arrangement," or "liquid film charging electrodes" to indicate the origin of the electric charges carried by the spray particles. It should be understood that reference is made to the tube 10 of Fig. 4, or both the tube 10 and electrode 11 of Figures 1, 2 and 3, or similar electrode means for projecting electrically charged liquid particles. It is also possible to use a rotary cup atomizer for generating an electrically charged liquid spray, although with many liquids evaporation from the liquid film in the cup would create a problem.

In the several forms of apparatus shown in the drawings it should be understood that either positively or negatively ionized gas can be obtained by proper arrangement of the polarities of the potential sources shown. It should further be understood that the location of ground potential and the identification of the electrodes in relation to the reaction vessel shown in the several figures is representative of only one preferred form of apparatus. Other forms and arrangements are possible in which the intermediate electrode or collecting electrode might be grounded and might be identified with the reaction vessel shell, rather than a grounded emitting electrode identified with the vessel shell as shown in the drawings. All such arrangements fall within the description in the various claims which specify the three electrodes, the drift of charged spray particles and reactants along a path from the emitting electrode toward the intermediate electrode and finally toward the collecting electrode with interelectrode potential differences relative to emitting electrode potential increasing along the path of said spray particles.

This invention has been illustrated only in a general preferred form throughout and it should be understood that it is capable of many and varied modifications without departing from its purpose and scope and I therefore believe myself to be entitled to make and use any and all of these modifications such as suggest themselves to those skilled in the art to which the invention is directed, provided that such modifications fall fairly within the purpose and scope of the hereinafter appended claims.

What is claimed is:

1. The method of reacting liquid and gaseous substances comprising providing a reaction zone with an emitting electrode arrangement, an intermediate electrode and a collecting electrode; passing said gaseous substances to be reacted through said zone while projecting electrically charged spray particles of said liquid substance from said emitting electrode arrangement toward said intermediate electrode and said collecting electrode respectively; maintaining said intermediate electrode and collecting electrode at unidirectional electric potential differences relative to emitting electrode arrangement potential which potential differences promote the electrical charging of said spray particles and progressively increase along the path of said electrically charged spray particles, said potential differences between said electrodes being limited to values such that direct interelectrode discharging does not take place; gasifying said electrically charged liquid spray particles in space in the absence of high frequency electric fields by absorbing heat from said reaction zone to produce ionized gas and to bring about a chemical reaction with said gaseous substances; concurrently causing a drift through said reaction zone of said electrically charged liquid spray particles, gas ions and electrically charged reaction products towards said collecting electrode and withdrawing the reaction products from said zone.

2. The method of claim 1 further characterized by having the electrically charged spray particles of liquid reactant projected into the reaction zone countercurrent to the flow of the gaseous substances to be reacted.

3. The method of reacting a liquid and gaseous substances comprising providing a reaction zone with liquid film charging electrodes, an intermediate electrode and a collecting electrode; passing said liquid between said liquid film charging electrodes which have a unidirectional electric potential difference sufficient to produce a displacement type charging current in said liquid; circulating said gaseous substances to be reacted through said zone while projecting electrically charged spray particles of said liquid substance from said liquid film charging electrodes toward said intermediate electrode and said collecting electrode respectively; maintaining said intermediate electrode and collecting electrode at unidirectional electric potential differences relative to a liquid film charging electrode which latter potential differences promote the electrical charging of said spray particles and progressively increase along the path of said electrically charged spray particles, the said latter potential differences between said electrodes being limited to values such that direct interelectrode discharging does not take place; gasifying said electrically charged liquid spray particles in space in the absence of high frequency electric fields by absorbing heat from said reaction zone to produce ionized gas and to bring about a chemical reaction with said gaseous substances; concurrently causing a drift through said reaction zone of said electrically charged liquid spray particles, gas ions and electrically charged reaction products towards said collecting electrode and withdrawing the reaction products from said zone.

4. The method of claim 3 further characterized by having the electrically charged spray particles of liquid reactant projected into the reaction zone countercurrent to the flow of the gaseous substances to be reacted.

5. The method of reacting a liquid and gaseous substances comprising providing a reaction zone with liquid film charging electrodes, an intermediate electrode and a collecting electrode; passing said liquid between said liquid film charging electrodes which have a unidirectional electric potential difference sufficient to produce a displacement type charging current in said liquid; circulating said gaseous substances to be reacted through said zone while projecting a jet spray of said liquid substance from said liquid film charging electrodes toward said intermediate electrode and said collecting electrode respectively, said liquid spray being electrically charged due to the said electric potential difference between said liquid film charging electrodes in combination with unidirectional electric potential differences impressed between one liquid film charging electrode and said intermediate electrode and said collecting electrode respectively, said latter potential differences progressively increasing along the path of said electrically charged spray particles and said latter potential differences being limited to values such that direct interelectrode discharging does not take place; gasifying said electrically charged liquid spray particles in space in the absence of high frequency electric fields by absorbing heat from said reaction zone to produce ionized gas and to bring about a chemical reaction with said gaseous substances; concurrently causing a drift through said reaction zone of said electrically charged liquid spray particles, gas ions and electrically charged reaction products towards said collecting electrode and withdrawing the reaction products from said zone.

6. The method of producing ionized gas in a reaction vessel comprising projecting electrically charged spray particles of a liquid reactant into said reaction vessel from an emitting electrode arrangement towards an intermediate electrode and a collecting electrode respectively, each of said electrodes being provided in said reaction vessel; maintaining said intermediate electrode and collecting electrode at unidirectional electric potential differences relative to emitting electrode arrangement potential which potential differences promote the electrical charging of said liquid spray particles and progressively increase along the path of said electrically charged spray particles and said potential differences between said electrodes being limited to values such that direct interelectrode discharging does not take place; gasifying said electrically charged liquid spray particles in space in the absence of high frequency electric fields by absorbing heat in said reaction vessel to produce ionized gas and concurrently causing said ionized gas to drift through said reaction vessel towards said collecting electrode and withdrawing reaction products from said vessel.

7. The method of producing ionized gas in a reaction vessel comprising passing into said reaction vessel a liquid reactant under pressure through a close clearance passage with a unidirectional electric potential difference impressed between opposite conducting walls of said passage which potential difference is sufficient to produce a displacement type charging current in said liquid reactant; forming a jet spray where said liquid reactant issues from said passage, said liquid spray being directed in said reaction vessel towards an intermediate electrode and a collecting electrode respectively; maintaining said intermediate electrode and collecting electrode at unidirectional electric potential differences relative to the potential of one wall of said liquid passage which latter potential differences promote the electrical charging of said liquid spray particles and progressively increase along the path of said electrically charged spray particles, the said latter potential differences between said electrodes being limited to values such that direct interelectrode discharging does not take place; gasifying said liquid spray particles in space in the absence of high frequency electric fields by absorbing heat in said reaction vessel to disperse the electric charges carried by said spray particles and to produce gas ions and withdrawing reaction products from said reaction vessel.

8. The method of producing ionized gas of one polarity in a reaction vessel comprising passing a liquid reactant under pressure through a close clearance passage having opposite walls of said passage of electrically conducting material and one wall being coated with a fixed layer of insulating material, said opposite conducting walls of said passage having a unidirectional electric potential difference impressed between them sufficient to produce a displacement type charging current in the liquid; forming a jet spray where said liquid issues from said passage, said liquid spray being directed toward an intermediate electrode and a collecting electrode respectively and said liquid spray being electrically charged due to the said electric potential difference impressed between opposite walls of said liquid passage in combination with unidirectional electric potential differences impressed between the uncoated wall of said passage and said intermediate electrode and said collecting electrode respectively, the latter potential differences being limited to values such that direct interelectrode discharging does not take place and said latter potential differences progressively increasing along the path of said electrically charged spray particles; gasifying said liquid spray particles in space in the absence of high frequency electric fields by absorbing heat in said reaction vessel to disperse the electric charges carried by said spray particles and to produce gas ions and withdrawing reaction products from said reaction vessel.

9. The method of claim 8 further characterized by agitating the liquid reactant while said liquid is passing through said close clearance passage.

10. The method of claim 1 utilized for ammonia synthesis wherein the electrically charged spray particles are liquid nitrogen and the gaseous reactant passed through said reaction zone is hydrogen rich gas, said reactants being supplied to said reaction zone with a substantially superatmospheric pressure and a temperature of above about 100° F. maintained in the reaction zone, and the reaction product withdrawn from said reaction zone being ammonia principally in gaseous phase mixed with unreacted portions of said reactant gases.

11. The method of producing ionized gas of one polarity in a reaction vessel comprising passing a liquid reactant under pressure through a close clearance passage with a unidirectional electric potential difference impressed between opposite conducting walls of said passage which potential difference is sufficient to produce a displacement type charging current in said liquid reactant; forming a jet spray where said liquid reactant issues from said passage, said liquid spray being directed between two intermediate deflecting electrodes which are oriented with respect to the axis of said jet spray in substantial alinement each with one of said opposite conducting walls of said liquid passage; maintaining each intermediate deflecting electrode at a unidirectional electric potential difference relative to its alined and associated liquid passage conducting wall which potential differences are of such magnitude that in combination with the said unidirectional potential difference between said liquid passage opposite conducting walls and a consequent unidirectional potential difference between said intermediate deflecting electrodes electrically charged liquid spray particles of one polarity are produced and deflected toward one intermediate deflecting electrode and charged liquid spray particles also produced of opposite polarity are deflected toward the other intermediate deflecting electrode thereby accomplishing a separation of electrically charged spray particles of said one polarity from electrically charged spray particles of opposite polarity; said one polarity electrically charged liquid spray particles being directed toward a collecting electrode which is maintained at a unidirectional electric potential difference relative to an associated intermediate deflecting electrode such that the potential differences respectively of said collecting electrode and its associated intermediate deflecting electrode relative to the said associated conducting wall of said liquid passage progressively increase along the path of said electrically charged liquid spray particles of said one polarity; all interelectrode potential differenes in said reaction vessel being limited to values such that direct interelectrode discharging does not take place; gasifying in space in the absence of high frequency fields said electrically charged liquid spray particles of said one polarity to disperse the electric charges carried by said spray particles and to produce one polarity gas ions and withdrawing reaction products from said reaction vessel.

12. The method of claim 6 utilized for a polymerization reaction comprising allowing said ionized gas to react with itself; discharging unreacted gas ions and electrically charged reaction products at said collecting electrode and withdrawing reaction products from the reaction vessel.

13. The method of claim 2 utilized for a polymerization reaction wherein the substances electrically charged spray particles are liquid n butane and the gaseous substances passed through said reaction zone are n butane rich gas, said reactants being supplied to said reaction zone with a substantially superatmospheric pressure and a temperature of above about 70° centigrade maintained in the reaction zone, and the polymerization reaction product withdrawn from said reaction zone being hydrocarbons heavier than n butane principally in gaseous phase mixed with unreacted n butane rich gas.

14. The method of claim 1 utilized for a synthesis reaction wherein the liquid substance which is introduced into the reaction space as an electrically charged spray which is gasified and ionized is a hydrocarbon liquid of narrow boiling range and the gaseous substance passed through said reaction zone is carbon monoxide gas; bringing said ionized hydrocarbon gas into contact with carbon monoxide gas, said reactants being supplied to said reaction zone at a substantially superatmospheric pressure and a temperature in the reaction zone such that said hydrocarbon reactant remains in gaseous phase and synthesis reaction products remain substantially in gaseous phase; discharging unreacted hydrocarbon gas ions and electrically charged reaction products including hydrocarbons of increased molecular weight compared to said hydrocarbon reactant and oxygenated hydrocarbons at said collecting electrode and withdrawing said reaction products from the reaction vessel.

15. The method of claim 1 utilized for a synthesis reaction wherein the said liquid substance which is introduced into the reaction zone as an electrically charged spray which is gasified and ionized is n butane and the gaseous substance passed through said reaction zone is carbon monoxide gas; bringing said ionized n butane gas into contact with carbon monoxide gas, said reactants being supplied to said reaction zone at a substantially superatmospheric pressure and a temperature in the reaction zone maintained at above about 100° centigrade; discharging unreacted n butane gas ions and electrically charged synthesis reaction products at said collecting electrode and withdrawing said products including hydrocarbons of increased molecular weight and oxygenated hydrocarbons from the reaction vessel.

16. The method of claim 1 utilized for a synthesis reaction wherein the said liquid substance which is introduced into the reaction zone as an electrically charged spray which is gasified and ionized is water and the gaseous substances passed through said reaction zone are carbon monoxide gas and hydrogen gas; bringing said ionized water vapor into contact with a mixture of carbon monoxide gas and hydrogen gas, said reactant gases and vapor in said reaction zone being at a substantially superatmospheric pressure and a temperature in the reaction zone being maintained at above about 200° centigrade; discharging unreacted water vapor ions and electrically charged synthesis reaction products at said collecting electrode and withdrawing said products including oxygenated hydrocarbons from the reaction vessel.

17. A gaseous phase electric space charge device comprising a close clearance liquid film passage between opposite electrode walls; means for passing a liquid reactant under pressure through said close clearance passage with a unidirectional electric potential difference impressed between said opposite electrode walls; means for forming a jet spray where said liquid reactant issues from said passage and for directing said liquid spray between two intermediate deflecting electrodes which are oriented with respect to the axis of said jet spray in substantial alinement each with one of said opposite electrode walls of said liquid film passage; means for impressing unidirectional electric potential differences respectively between each of said intermediate deflecting electrodes and its alined and associated liquid passage electrode wall which potential differences are of such magnitude that in combination with the said unidirectional potential difference between said liquid passage opposite electrode walls and a consequent unidirectional potential difference between said intermediate deflecting electrodes electrically charged liquid spray particles of one polarity are produced and deflected toward one intermediate deflecting electrode and electrically charged liquid spray particles also produced of opposite polarity are deflected toward the other intermediate deflecting electrode thereby accomplishing a separation of said electrically charged spray particles of said one polarity from electrically charged spray particles of opposite polarity; means for directing said one polarity electrically charged liquid spray particles toward a collecting electrode having a unidirectional electric potential difference relative to an associated intermediate deflecting electrode such that the potential differences respectively of said collecting electrode and its associated intermediate deflecting electrode relative to said associated liquid passage electrode wall progressively increase along the path of said electrically charged liquid spray particles of said one polarity; means for gasifying in space in the absence of high frequency electric fields said electrically charged liquid spray particles of said one polarity to disperse the electric charges carried by said spray particles and to produce one polarity gas ions; means for introducing other gaseous reactants into said device and for withdrawing reaction products from said device.

18. A gaseous phase electric space charge device comprising a close clearance liquid film passage between opposite electrode walls; means for passing a liquid reactant under pressure through said close clearance passage into said device and for forming a jet spray where said liquid issues from said passage; means for impressing a unidirectional electric potential difference between said electrode walls of said liquid film passage sufficient to produce a displacement type charging current in said liquid reactant; an intermediate electrode formed to provide a path for said liquid spray and a collecting electrode; means for directing said liquid spray toward said intermediate electrode and said collecting electrode respectively; means for impressing unidirectional electric potential differences between one electrode wall of said liquid passage and said intermediate electrode and collecting electrode respectively which latter potential differences promote the electrical charging of said liquid spray particles and progressively increase along the path of electrically charged spray particles; means for gasifying said electrically charged liquid spray particles in space in the absence of high frequency electric fields to disperse the electric charges carried by said liquid spray particles and to produce gas ions; means for withdrawing reaction products from said device.

19. The device of claim 18 further characterized by having means for introducing other gaseous reactants into said device.

20. A gaseous phase electric space charge device comprising a close clearance liquid film passage having one conducting electrode wall and an opposite electrode wall which is coated with a fixed layer of insulating material; means for passing a liquid reactant under pressure through said close clearance passage and for forming a jet spray where said liquid issues from said passage; means for impressing a unidirectional electric potential difference between said electrode walls of said liquid film passage sufficient to produce a displacement type charging current in said liquid reactant; an intermediate electrode formed to provide a path for said liquid spray and a collecting electrode; means for directing said liquid spray toward said intermediate electrode and said collecting electrode respectively; means for impressing unidirectional electric potential differences between said conducting electrode wall of said liquid film passage and said intermediate electrode and said collecting electrode respectively, said latter potential differences progressively increasing along the path of said electrically charged spray particles; said liquid spray particles being electrically charged to a single polarity due to all said potential differences in combination; means for gasifying said electrical charged spray particles in space in the absence of high frequency electric fields to disperse the electric charges carried by said liquid spray particles and to produce single polarity gas ions; means for introducing other gaseous reactants into said device and for withdrawing reaction products from said device.

21. The device of claim 20 further characterized by having means for agitating said liquid reactant in said close clearance liquid film passage.

22. The method of claim 1 wherein the liquid substance which is introduced into the reaction zone as an electrically charged spray and is gasified and ionized is a polymerizable compound, and the gaseous substances passed through said reaction zone are a recycle gas mixture containing the said polymerizable compound in gas phase.

23. The device of claim 18 further characterized by having the said close clearance liquid passage provided with an outward spreading throat where said liquid spray jet issues from said passage so that the clearance between the walls of said passage of opposite electric potential gradually increases and the said electric potential difference between passage walls is effective at the moment and immediately after a liquid jet is formed in space.

LESTER H. SMITH.

REFERENCES CITED

The following references are of record in the file of this patent:

UNITED STATES PATENTS

| Number | Name | Date |
| --- | --- | --- |
| 2,301,315 | Opp | Nov. 10, 1942 |
| 2,334,377 | Bennett | Nov. 16, 1943 |
| 2,454,757 | Smith | Nov. 23, 1948 |

FOREIGN PATENTS

| Number | Country | Date |
| --- | --- | --- |
| 421,811 | Great Britain | Dec. 20, 1934 |
| 502,063 | Great Britain | Mar. 10, 1939 |